Sept. 3, 1940.  N. TESTI  2,213,291
SHAVING IMPLEMENT
Filed Dec. 15, 1937
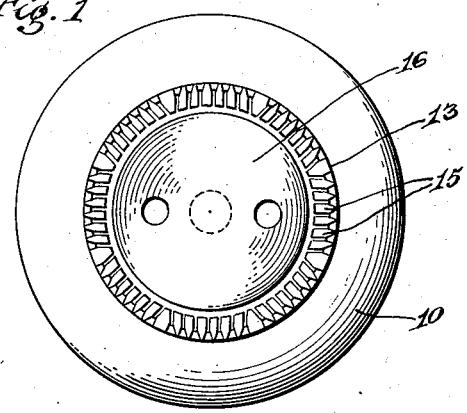
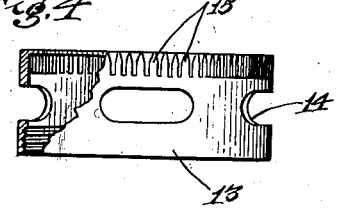
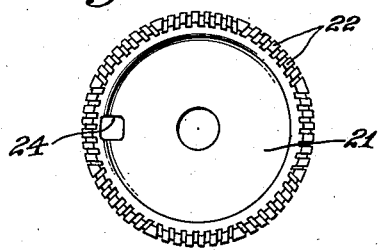
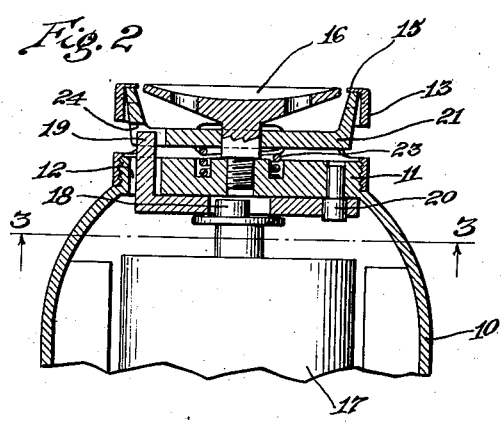
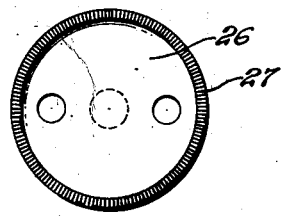
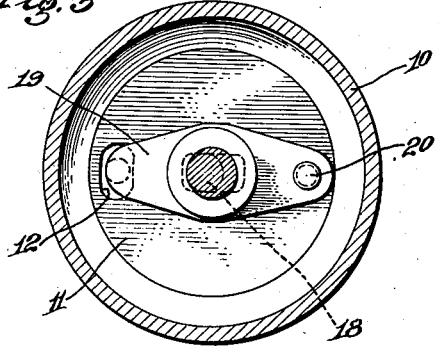
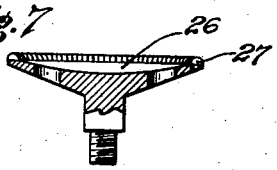
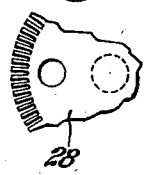
INVENTOR
Nicholas Testi
BY
ATTORNEY Patented Sept. 3, 1940

2,213,291

UNITED STATES PATENT OFFICE 2,213,291

SHAVING IMPLEMENT

Nicholas Testi, Boston, Mass., assignor to Gillette Safety Razor Company, Boston, Mass., a corporation of Delaware Application December 15, 1937, Serial No. 179,951

3 Claims. (Cl. 30—43)

This invention relates to dry shaving implements of the type employing shearing members of circular or cylindrical shape, particularly those having an annular shearing zone. Its general objects are to improve the efficiency in operation of such implements and to simplify their mechanical design so that costs of manufacturing may be reduced.

One important feature of the invention consists in a guard member disposed within the annular shearing zone of the implement and preferably adjustable as to height relative to the shearing teeth of the implement. As herein shown the outer and normally stationary shearing member and its cooperating cutter are arranged for adjustment together with respect to the center guard and without disturbing the shearing relation of these two members; that is to say, when the outer shearing member is moved downwardly or inwardly with respect to the guard the cooperating cutter is carried with it. This is practicable in the implement of my invention on account of the novel organization of the operative parts of the implement and makes provision for adjusting the closeness of the shaving operation effected by it.

As herein shown and in accordance with another feature of the invention the center guard is so shaped as to provide a journal for the cutter. The cutter and guard are mounted outside the end wall of the casing and an oscillatory operating arm is mounted in the casing in direct connection with the actuating motor of the implement. The operating arm extends outwardly through the end wall of the casing into operative engagement with the cutter.

The center guard, in addition to its function as a guard for the shearing teeth and gauge for the surface being shaved may, if desired, be provided with a serrated rim which is effective for straightening and lifting bent over hairs to present in favorable condition to the shearing zone.

Another feature of the invention consists in a novel arrangement of shearing teeth in the cutter and in the outer stationary member or in either of them. Heretofore, in an annular shearing zone the individual teeth have extended in substantially radial direction and their formation has required an extensive indexing operation. In accordance with one feature of the present invention, however, the shearing teeth are formed in separate groups in each of which the teeth are all disposed in parallel relation, although the teeth of adjacent groups are disposed in angular relation. By this expedient the teeth about the entire circumference of an annular shearing zone may be formed by four, six or eight gang cutting operations requiring only a corresponding number of indexing steps. Ordinarily, the center teeth of each group will be disposed in radial position and those at each side of the groups will diverge somewhat from a radial direction but this divergence does not impair the shearing efficiency of the annular shearing zone to any appreciable degree.

These and other features of the invention will be best understood and appreciated from the following description of a preferred embodiment thereof, selected for purposes of illustration and shown in the accompanying drawing, in which Fig. 1 is a view of the implement as seen from the end, on an enlarged scale;

Fig. 2 is a similar view in longitudinal section, a part of the implement being broken away;

Fig. 3 is a cross-sectional view on the line 3—3 of Fig. 2;

Fig. 4 is a view in elevation of the outer or stationary shearing member, a portion shown as being broken away;

Fig. 5 is a plan view of the rotary cutter shown in Figs. 1 and 2;

Figs. 6 and 7 are plan and sectional view of a modified guard; and

Fig. 8 is a fragmentary view of a guard of another modified construction.

The implement herein shown includes in its structure a casing 10 of plastic material, such as "Bakelite" which is shaped to serve as a handle for the implement and also as a housing for its operating motor. The casing 10 terminates at its upper end in a wall shaped as a flat circular boss 11 having an external thread and an aperture 12 near one edge. The outer and stationary shear member comprises a cylindrical cap 13 having at its lower end an internal thread to receive the thread of the boss 11 and at its upper end a narrow inturned overhanging flange transversely slotted to form shearing teeth 15. The cap 13 is also provided with elongated circumferential slots or openings 14 in its cylindrical wall through which the shaving debris may be easily removed from the implement.

The slots forming the shearing teeth 15 extend not only through the overhanging flange but down into the cylindrical wall of the cap 13 so that hairs may pass freely through them and reach the annular shearing zone beneath the overhanging portion of the teeth 15. The slots are flared outwardly to facilitate the passage of hairs between the teeth. The slots, moreover, are arranged in eight separate groups of seven parallel slots and thus each groups of slots may be cut by a gang cutter having seven identical cutting disks. It will be seen, therefore, that the teeth about the entire circumference of the cap 13 may be cut in eight positions of the cap instead of requiring fifty-six separate indexing steps, as would be necessary if the shearing teeth were each radially disposed.

A circular guard 16 having a concave face is disposed concentrically within the cap 13, being spaced uniformly within the inner periphery of the shearing teeth 15 by a narrow circular opening. The guard 16 has a threaded stem which is screwed into the boss 11 of the casing, the stem having a cylindrical shank portion which serves as a journal for the oscillatory cutter 21. The cutter is circular in contour and cup-shaped, having a peripheral upstanding annular flange slotted to form shearing teeth 22 which, as shown in Fig. 5, may be arranged similarly to the stationary shearing teeth 15, that is to say, in eight groups of seven parallel slots forming the teeth between them and angularly arranged in adjacent groups. In the illustrated cutter each groups of teeth is disposed at an angle of 45° to the teeth of the next adjacent group. A compression spring 23 seated in a groove in the boss 11 and bearing against the under side of the cutter 21 presses the teeth of the cutter yieldingly against the overhanging teeth of the cap 13. It will be noted that by screwing the cap 13 in one direction or the other the tension between the two sets of shearing teeth may be varied and adjusted as well as the height of the shearing plane with reference to the center guard 16.

The casing or housing 10 contains the rotor 17 of a motor, partially shown in Fig. 2. At its upper end the rotor shaft has an eccentric pin 18 which enters a slot formed in an oscillatory arm 19 pivotally mounted beneath the boss 11 upon a vertical stud 20. The arm 19 has an upturned end which extends up through the aperture 12 in the boss 11 and engages an aperture 24 in the body of the cutter 21. It will be apparent that as the rotor 17 revolves the eccentric pin 18 will oscillate the arm 19 about the axis of the stud 20 and that the upturned end of the arm 19 will correspondingly oscillate the cutter 21 about the axis of the centrally disposed guard stem. The amplitude of oscillation is sufficient to carry the shearing teeth of the cutter past the adjacent shearing teeth of the stationary member 13 so that each hair passing through the slots and projecting downwardly beneath the teeth 15 is immediately sheared. It will be noted that hairs may pass not only inwardly to the shearing zone, but that the annular space between the center guard 16 and the inner ends of the shearing teeth permits the hairs to reach the shearing zone from its inner periphery as the implement is moved across the face of the user.

In Figs. 6 and 7 is shown an alternative form of center guard comprising a concave disk 26 having a serrated upstanding circumferential ring 27, the purpose of this being to comb and straighten hairs which may pass to the shearing zone from within the implement. In Fig. 8 a slightly different construction is shown in which the concave disk 28 of the center guard is serrated radially for the same purpose. The combing and straightening effect of the center guard, as well as its gauging effect, may be varied and regulated very conveniently by screwing the cap 13 up or down with respect to the guard as already explained.

Having thus disclosed my invention I claim as new and desire to secure by Letters Patent:

1. A dry shaving implement having a casing terminating in a threaded circular boss, a cylindrical member threaded upon said boss and having an inturned flange at its outer end slotted to present an annular series of shearing teeth, a guard disk arranged concentrically within said series of teeth and having a stem secured in said boss, an annular toothed cutter journaled on said stem outside the boss, and actuating means for the cutter.

2. A dry shaving implement having a casing terminating in a projecting circular boss, a cylindrical member fitted upon said boss and having an inturned flange at its outer end slotted to present an annular series of shearing teeth, a guard disk concentrically arranged within said series of teeth and having a stem secured in said boss, a rotary cutter journaled on the stem of the guard disk and being adjustable together with the cylindrical member with respect to the guard disk, and actuating means for the cutter.

3. A dry shaving implement having a casing terminating in a projecting circular boss, a cylindrical member fitted upon said boss and having an inturned overhanging flange at its outer end slotted to present an annular series of stationary shearing teeth, a guard disk for determining the closeness of the shearing operation concentrically mounted within said annular series of teeth and having a stem secured in said boss, a rotary cutter concentric with respect to the guard disk and having shearing teeth cooperating with the stationary teeth of said annular series, and actuating means for the rotary cutter.

NICHOLAS TESTI.